United States Patent [19]

Varadibriarwood et al.

[11] 3,857,046

[45] Dec. 24, 1974

[54] SHIFT REGISTER-DECODER CIRCUIT FOR ADDRESSING PERMANENT STORAGE MEMORY

[75] Inventors: Andrew G. Varadibriarwood; Richard B. Rubinstein, both of New York, N.Y.; Steven Radoff, Nashua, N.H.

[73] Assignee: General Instrument Corporation, Newark, N.J.

[22] Filed: May 8, 1972

[21] Appl. No.: 251,525

Related U.S. Application Data

[62] Division of Ser. No. 86,882, Nov. 4, 1970, Pat. No. 3,691,534.

[52] U.S. Cl. ............ 307/221 R, 307/221 C, 328/37

[51] Int. Cl. ............................................ G11c 11/00

[58] Field of Search ........ 307/221 C, 221 F; 328/37

[56] References Cited

UNITED STATES PATENTS

| | | | |
|---|---|---|---|
| 3,431,433 | 3/1969 | Ball et al. | 307/221 C |
| 3,518,451 | 6/1970 | Booher | 307/221 C |
| 3,601,627 | 8/1971 | Booher | 307/221 C |
| 3,609,392 | 9/1971 | Tetik | 307/221 C |
| 3,609,393 | 9/1971 | Yao | 307/221 C |

*Primary Examiner*—John S. Heyman

[57] ABSTRACT

A shift register-decoder circuit is adapted to preset the memory location in the data storage section of a permanent storage memory from which data is initially transferred to an output node. That circuit comprises a shift register having a plurality of stages and a corresponding plurality of logic decoder circuits. The logic decoder stages are operatively associated respectively with a plurality of column output nodes and are adapted in response to an input address signal to initially uniquely charge a selected one of said column output nodes. Subsequently, the logic decoder circuit is disabled and the shift register is enabled and is effective to shift the column select signal sequentially to successive columns under the influence of an external clock signal. The resulting data scanning operation continues until the memory is disabled by the operation of a disabling circuit.

2 Claims, 4 Drawing Figures

SHIFT REGISTER-DECODER CIRCUIT FOR ADDRESSING PERMANENT STORAGE MEMORY

This is a divisional of application Ser. No. 86,882 filed Nov. 4, 1970, entitled "Read Only Memory Having Increased Rate of Data Readout," now U.S. Pat. No. 3,691,534, issued Sept. 12, 1972.

The present invention relates to memory systems, and in particular to a shift register-decoder circuit for selecting an initial data readout location and for thereafter sequentially scanning successive memory locations in a memory system.

A memory system is an integral part of a digital processing computer. Its basic function in the computer is to store data in a manner which permits that data to be readily interrogated or "read" and transferred either from the memory to succeeding logic or arithmetic stages in the computer or to the computer readout section. One basic type of memory is the permanent storage or "read-only" memory in which data is stored in permanent form in a predetermined arrangement. For this type of memory data can only be read; that is, no provision is made for inserting or writing new data into an address in that memory. A memory of this general type is described in a co-pending patent application Ser. No. 791,759, filed on Jan. 16, 1969 in the name of Richard B. Rubinstein and Andrew G. Varadi, entitled "Read-Only Memory With Operative And Inoperative Data Devices Located At Address Stations And With Means For Controllably Charging And Discharging Appropriate Nodes Of The Address Stations," now U.S. Pat. No. 3,611,437, and assigned to the assignee of the present application.

In a commonly employed type of memory a portion of the memory may be addressed in a random manner and data from that selected portion is then scanned and transferred to an output location. This type of memory may be used in a computer system in which an initially selected address determines which of a multiplicity of multi-bit words is to be read out from the memory. Thus, a single address function to the memory is effective to produce a word having a predetermined number of bits, that word being produced by sequentially scanning and transferring information bits from a different location in the addressed portion of the memory during each clock period. For example, in a computer programmed for preparing standard invoices, order letters and the like, the initial addressing operation instructs the memory to prepare a specified type of invoice. The computer then automatically sequentially reads the stored information at the selected portion of the memory and produces from the information stored in the selected portion of the memory a form corresponding to the particular invoice selected by the initial addressing of the memory.

As the desired output information may comprise a number of different multi-bit words, a number of memory sections in a given memory unit may be simultaneously scanned so that during each readout operation (i.e., during each clock period) one bit from each memory section in that unit is provided at the unit output. The number of bits in the output word is equal to the number of memory sections in the memory and the number of such multi-bit words is equal to the number of sequential scanning operations performed on the unit.

In the operation of memories in which data is sequentially read out from an addressed portion of the memory, it is often desirable to be able to select the location at that addressed portion of the memory from which the scanning operation is to begin. For example, in an arithmetic operation it may be desired to transfer a stored number beginning with a certain digit in that number corresponding to the location of the decimal point, so that the scanning sequence would begin at a specified digit in that stored number. Heretofore, the selection of the point at which the scanning was begun, was effected by supplying information in parallel word form to a shift register or the like to preset the register. This, however, required the use of additional logic circuitry to produce the parallel word and to process and transmit that word to the shift register in a manner effective to preset the register for the purposes described.

It is, therefore, an object of the present invention to provide a memory system in which data is sequentially transferred to an output and in which the point at which the sequential data transferring operation is begun is preset in a novel and effective manner which reduces the complexity of the data scanning circuitry.

In accordance with the present invention a shift register-decoder circuit is provided including a plurality of shift register stages each of which is operably connected to a source of timed signals. A corresponding plurality of logic decoder circuits are also provided. The logic circuits are conditioned by an input address signal to initially (i.e., prior to a scanning operation) select the memory section from which the data scanning or transferring sequence is to be initiated.

Each logic circuit has a logic terminal associated therewith. The input address signal is effective to establish a unique condition at one of the logic stages and to establish a unique signal level at the corresponding logic terminal. A plurality of nodes are provided and means actuatable by an enabling signal are effective when actuated to respectively operatively connect each of the logic terminals to the nodes to establish the unique logic level at one of the nodes. The connecting means is also effective, in the subsequent absence of the enabling signal to disconnect the logic terminals from the nodes and to operatively connect the register stages to the nodes. Thereafter the unique logic level is sequentially transferred from one of the nodes to a succeeding one of the nodes. The sequential transfer is controlled by the timed signals. Thus, starting from a selected memory location, the memory is scanned and information sequentially transferred.

The enabling signal is present only during a predetermined number of timed signals. The connecting means includes a first switch means connected between the logic terminals and the nodes which receives and is actuated by the enabling signal. This means also includes a second switch means connected between the register stages and the nodes and receives the complement of the enabling signal. Thus, the second switch means is actuated only when the enabling signal is not present. Therefore, the scanning operation takes place only after the enabling signal has terminated.

To the accomplishment of the above, and to such objects as may hereinafter appear, the present invention relates to a shift register-decoder circuit as defined in the appended claims and as described in this specification, taken together with the accompanying drawings in which:

The shift register-decoder circuit of the present invention may be utilized in conjunction with a memory unit having one or more memory sections or matrixes in which data is stored in different predetermined arrangements. These memory sections may be read-only memories of the general type disclosed in said copending patent application in which the particular logic bit stored at a given address is defined by the presence or absence of a potentially active switching device located at that address, although it is to be understood that other memories may be utilized in the memory system of this invention with equally satisfactory results.

Figure 1:
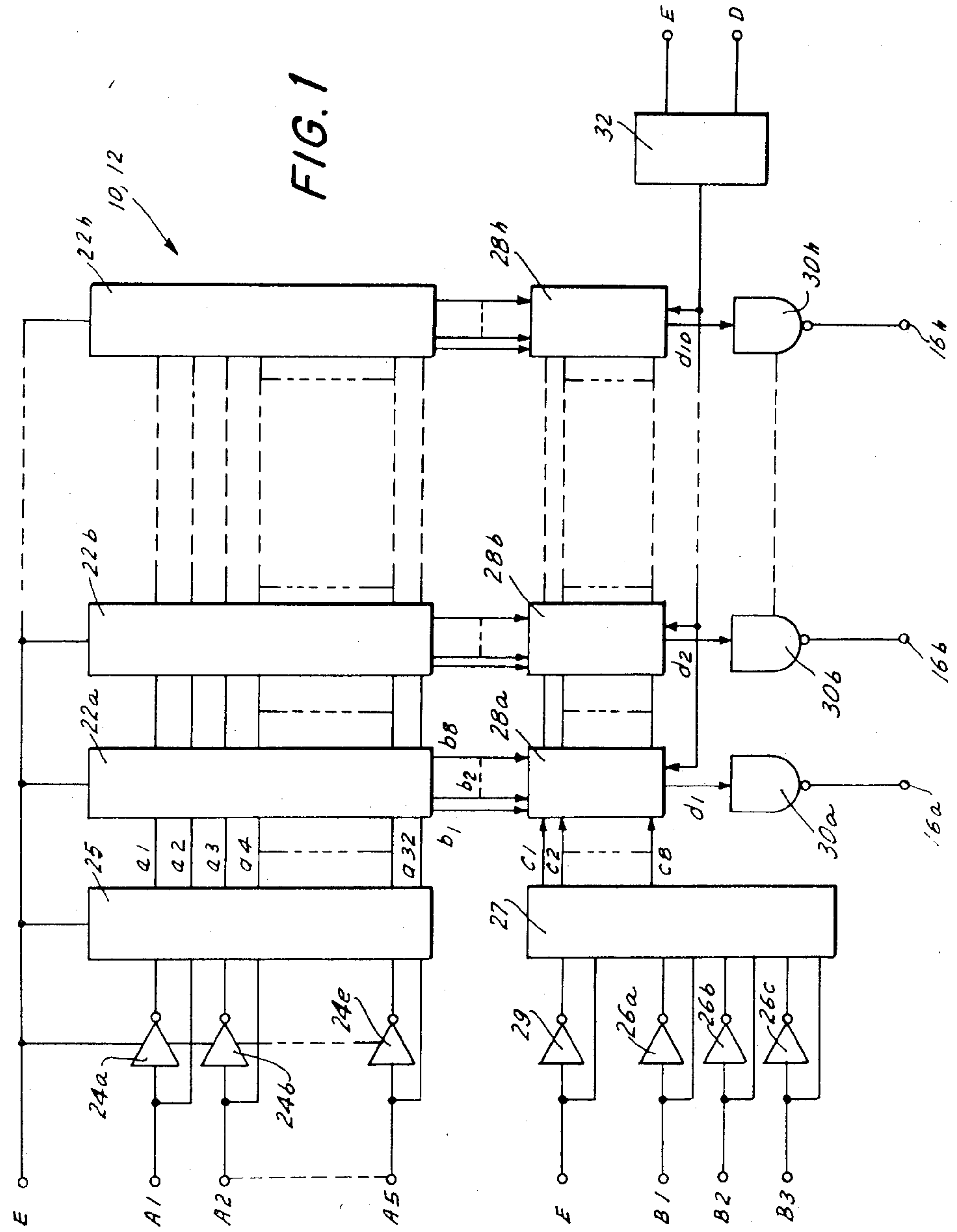
FIG. 1 is a block diagram of a memory unit of the type which can be utilized with the present invention.
Figure 4:
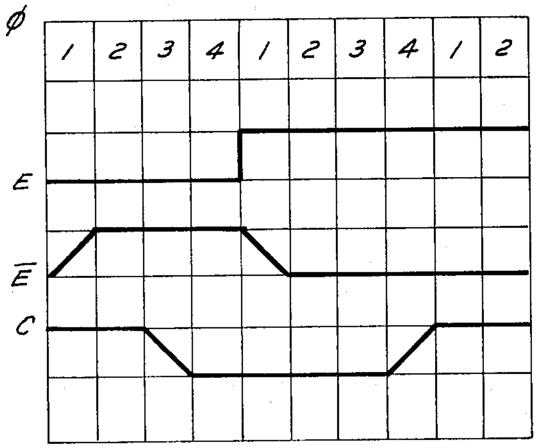
FIG. 4 is a waveform diagram of the enabling and the column select signal of the present invention.

The memory unit, as shown in FIG. 1, receives input four-phase clock signals φ1, φ2, φ3, φ4 which are each present during a unique portion of a given clock period. Addressing signals generally designated A and B, and an enabling signal E are also applied to the memory unit. As shown in FIG. 4, the enabling signal E is present (i.e., negative) throughout only one clock period during a complete scanning operation on the memory and absent (i.e., positive) thereafter.

The memory unit comprises addressing circuitry which translates the input addressing signals A, B, into address select signals. The latter signals are processed to produce data output signals corresponding to the stored information bit at the selected address in each of the memory units.

FIG. 1 schematically illustrates a memory unit. As here particularly described, the memory unit comprises eight read-only memory sections **22*a*–22*h* (only sections 22*a*, *b* and *h*** being shown in block diagram form in FIG. 1). Each memory section contains, for example, 32 rows intersecting with eight columns, thereby to define 256 address locations at the row-column intersections in each memory. A single logic bit is stored at each of these address locations at one of two discrete logivc levels corresponding to the logic 1 or logic 0 condition.

Each memory section is simultaneously addressed by means of a row select decoder 25 which receives the five row input signals A1–A5 and their complements produced by inverters **24*a*–24*e*** respectively, and logically processes these signals to produce a unique (negative) row select signal for the selected row. In this manner an output data signal is produced at each of the 64 columns, those data signals corresponding to the absence or presence of a switching device at the address locations defined at the intersections of these columns and the selected row.

The three column input signals B1, B2, and B3 and their respective complements produced in inverters **26*a*–26*c* respectively, are applied to the combination shift register and column decoder 27 of the present invention. During the enabling period, i.e., when the enabling signal E is present, decoder 27 produces a unique column select signal which is applied along with the selected data signals to the inputs of a plurality of NAND gates 28*a*–28*h* receiving the eight data outputs from memory sections 22*a*–22*h* respectively. The eight outputs of these gates represent the stored data at the intersections of the selected row and selected column in each of the eight memory sections 22*a*–22*h*. These data outputs are applied to the inputs of inverter output stages 30*a*–30*h*. The outputs of stages 30*a*–30*h* produced at output nodes 16*a*–16*h* respectively define an eight-bit output word which is transferred to output node 16.**

After the termination of the enabling period (i.e., after one clock period), the column decoder part of register-decoder 27 is disabled and the shift register part thereof is enabled and shifts the column select signal to an adjacent (e.g., lower) column each clock period. In this manner, the output data signals at each memory section **22*a*–22*h* are scanned during successive clock periods following the end of the enabling period. That data scanning operation begins at that column in each memory section initially selected by the column decoder and continues until the memory is disabled by the operation of a disabling circuit 32.** The memory unit comprises eight outputs, thereby to provide an eight-bit output word.

The output of disabling circuit 32 is operatively connected to gates **28*a*–28*h*. Under certain conditions, including the presence of an input disabling signal D at its input, circuit 32** produces an output disabling signal which when present is effective to block data signals from the unit outputs.

Figure 2:
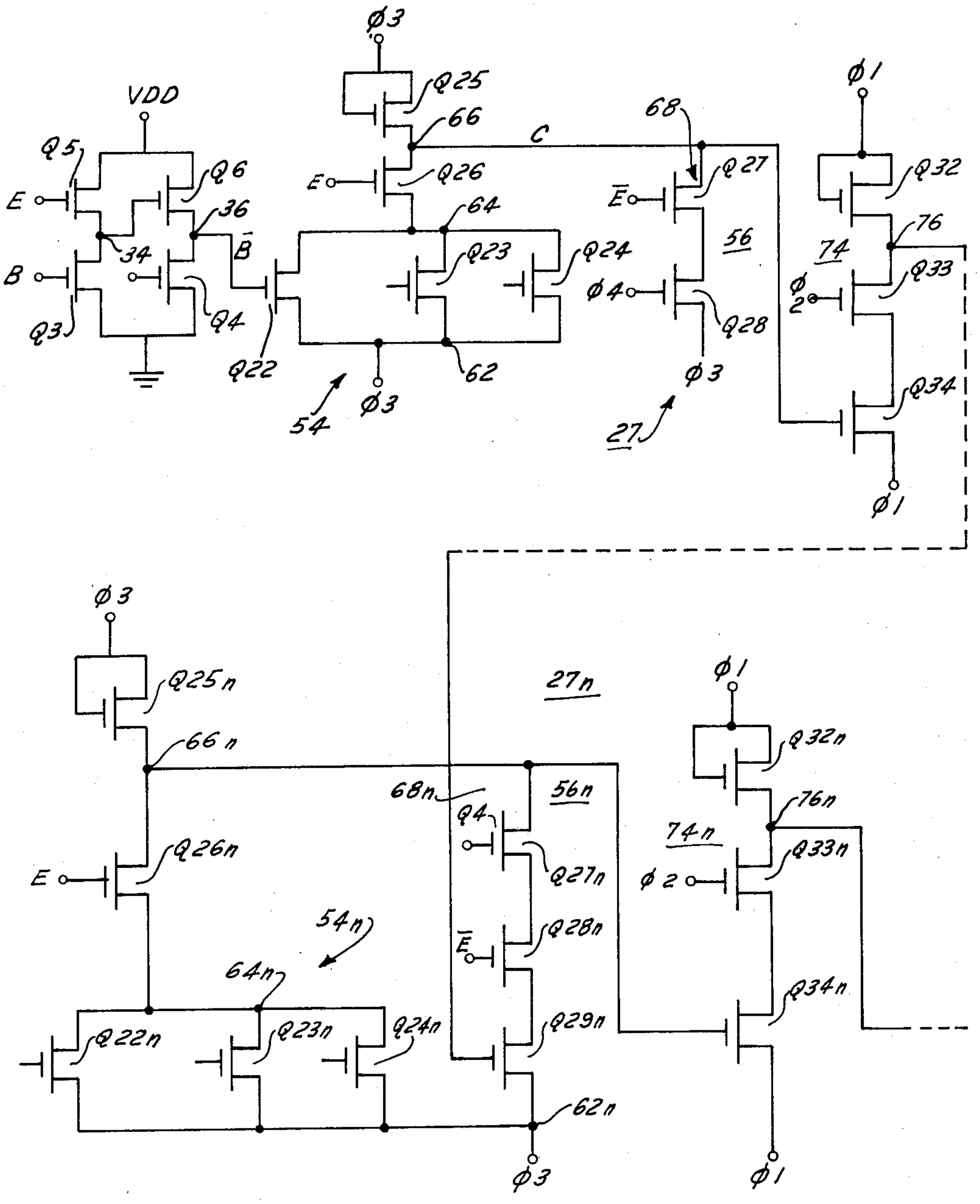
FIG. 2 is a schematic circuit diagram of representative sections of the present invention.

The column select signal is initially derived in a NOR gate 54 (See FIG. 2) of register-decoder 27 during the enabling period in accord with input column select signals B1–B3. After the termination of the enabling period, NOR gate 54 is disabled, and the column select signal is then shift once each clock period from its initial preset point by the operation of the shift register portion 56 of register-decoder 27 which is enabled at that time.

The complement of each column input signal is produced in an inverter 26 (only one of which is shown). Inverter 26 comprises FETs Q3 and Q4 each of which receives one of the three column select signals B1–B3 at its gate. The output circuit of FET Q3 is connected between ground and a point 34 defined at its junction with the output circuit of FET Q5 which receives the enabling signal E at its gate. The output circuit of FET Q4 is connected between ground and a point 36 defined at the junction with the output circuit of FET Q6, the gate of which is connected to point 34. FETs Q5 and Q6 have their output circuits connected to the $V_{DD}$ negative voltage supply.

During the enabling period, the E signal is negative and renders FET Q5 conductive to precharge point 34 to a negative level, which in turn renders FET Q6 conductive so as to precharge point 36 negative. If the column select signal B is positive, both FETs Q3 and Q4 remain in their off condition and point 36 remains negative. On the other hand, if the column select signal B is negative FETs Q3 and Q4 are both rendered conductive and points 34 and 36 are both connected to ground. As a result, FET Q6 is turned off and point 36 is discharged toward ground potential. The level at point 36 is thus the inverse $\overline{B}$ of the column select signal B.

Inverter 26 produces at point 36 the complement $\overline{B}$ of the column input signal B, that signal being applied to the gate of FET Q22, one of the FETs in column NOR gate 54. The other two FETs Q23 and Q24 in that gate respectively receive either the true or complement of one of the other two column input signals. The output circuits of FETs Q22–Q24 are connected in parallel between points 62 and 64. FETs Q25 and Q26 are connected between the $\phi 3$ clock phase source and point 64, and define a point 66 at the junction of their output circuits. The gate of FET Q25 receives the $\phi 3$ clock phase signal and the gate of FET Q26 receives the enabling signal E.

Point 66 is precharged negative through the output circuit of FET Q25 during $\phi 3$ time. If all the inputs to FETs Q22–Q24 in NOR gate 54 are positive (i.e., for the selected column) during the enabling period, there is a conducting path between points 62 and 64, and point 66 thus remains negative. the column select signal $c$ is produced at that point.

Figure 3:
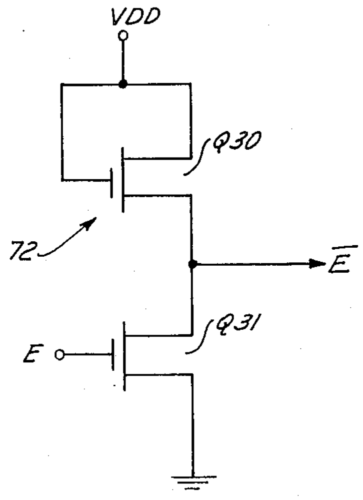
FIG. 3 is a schematic diagram of an inverter of the present invention used to produce the complement of the enabling signal.

Also connected to point 66 is one stage 68 of shift register 56, which comprises FET Q25 along with FETs Q27 and Q28. The output circuits of FETs Q27 and Q28 are connected in series between point 66 and the $\phi 3$ clock phase signal. The complement $\overline{E}$ of the enabling signal E (produced at point 70 in an inverter 72 comprising FETs Q30 and Q31 having their output circuits connected in series between $V_{DD}$ supply and ground, see FIG. 3) is applied to the gate of FET Q27 and the gate of FET Q28 receives the $\phi 4$ clock phase signal.

A shift register propagating stage 74 comprising FETs Q32 and Q33 and Q34 having their output circuits connected in series and at opposite ends to the $\phi 1$ clock phase signal source defines along with register stage 68 one bit of shift register 56. The gate of FET Q32 receives the $\phi 1$ clock phase signal, the gate of FET Q33 receives the $\phi 2$ clock phase signal and the gate of FET Q34 is connected to point 66. A point 76, defined at the junction of the output circuits of FETs Q32 and Q33, is connected to the succeeding register stage in shift register 56.

What has been so far described is the column 1 select circuitry for the memory unit. For each memory section there are eight such circuits, one circuit for each of the eight data-carrying columns in each of memory sections 22. This is represented by the broken line extending between point 76 and the column 8 register-decoder **27*n* towards the bottom of FIG. 2. Register-decoder 27*n* comprises a NOR gate 54*n* and a shift register 56*n* having stages 68*n* and 74*n*. The circuitry of each of the eight column register-decoders is essentially the same as that of register-decoder 27 and all components in register-decoder 27*n* corresponding to those in register-decoder 27** are identified by corresponding reference characters which have the subscript *n* added thereto. An FET Q29, not provided in shift-register 27, is provided in the other, i.e., columns 2–8, register-decoders and, as shown in register-decoder **27*n*,** it is connected between one output terminal of FET Q28*n* and the $\phi 3$ clock phase signal at point 62. The gate of FET Q29 is connected to the point 76 of the immediately preceding shift register (not shown) of the column 7 register-decoder (also not shown).

In the description to follow it is assumed that column 1 of the memory sections is to be initially addressed. During the enabling period when FET Q26 is conductive, FET Q27 controlled by the $\overline{E}$ signal is nonconductive. As a result, the column decoder NOR gate 54 is enabled (i.e., connected to point 66). At the termination of the enabling period this situation is reversed, and as shown in FIG. 4 the $\overline{E}$ signal becomes negative and the enabling E signal is at ground potential.

At this time, FET Q27 is rendered conductive and shift register 56 is enabled, i.e., connected to point 66, and the column decoder NOR gate 54 is disabled after having established, during the enabling period, a preset condition at point 66 corresponding to which of the eight columns in each memory section 22 is intially selected by the logic condition of the column input signals.

As a result, in the first clock period following the completion of the enabling period data is simultaneously read from all memory sections 22 from the address locations defined by the intersection of the selected row and the selected column. In the succeeding clock periods, the column selection is taken over by the shift register 56 which proceeds to shift the uniquely negative column select signal $c$ at point 66 one column upward with respect to the initially selected column. In other words, following the enabling period the column select signal $c$ at point 66 is determined by the operation of the bits of shift register 56. During $\phi 2$ time of each clock period following the completion of the enabling period, the shift register shifts one bit upward. As a result the point 66 of the initially selected column is charged to ground and the point 66 associated with the immediately succeeding column is charged negative to provide for data readout from that latter column.

The gate of FET Q34 receives the precharged negative signal from point 66 (for the initially selected column) and causes point 76 to be charged to ground during $\phi 2$ time through the output circuit of FET Q33. At this time the gate of FET Q29 is receiving a negative signal from the propagating stage of the next higher register bit. As a result during $\phi 4$ time following the termination of the enabling period at which time FET Q28 is turned on, point 66 is connected to point 62 (at ground potential during times other than $\phi 3$ time) to cause point 66 to charge to ground. In this manner the initially selected column is shifted to a nonselecting, i.e., ground condition.

At the same time the FET Q29 of the immediately succeeding column register-decoder receives a ground signal from point 76 of stage 74 so that its column select point 66, which is precharged negative during $\phi 3$ time, remains at that negative level for the second clock period following the completion of the enabling period to define the column select signal for that period. In this manner the uniquely negative column select signal $c$ is shifted upward (beginning at the column initially selected during the enabling period by NOR gate 54) during each clock period following the termination of the enabling period. Data is thus sequentially read out from a different column of the memory sections 22 each subsequent clock period.

In operation of the memory system such as could be used in conjunction with the present invention, row select and initial column select are effected during the enabling period. Following the completion of the enabling period information bits are read out from the selected row-column intersections of each memory section 22 in each unit during $\phi$3 time.

During the succeeding clock periods data is sequentially read-out from the memory unit from address locations defined by the intersections of the selected row, and progressively higher numbered columns. Information read-out continues until the circuit is disabled or the scanning operation is completed.

The output of the memory system at the output terminal comprises an eight-bit word. The number of such eight-bit words is determined by the number of columns sequentially scanned during a readout operation — up to a maximum of sixteen such eight-bit words.

Scanning is performed sequentially under the control of a novel shift register and column decoder circuit. That circuit is effective to initially preset the memory to establish the location from which the scanning procedure is initiated and then to change the column select signal each succeeding clock period.

While only a single embodiment of the present invention has been herein specifically disclosed, it will be apparent that many variations can be made thereto without departing from the spirit and scope of the invention.

We claim:

1. A shift register circuit comprising a plurality of shift register stages each operably connected to a source of timed signals, a plurality of logic stages each having a logic terminal and receiving a set of input signals different from said timed signals which are effective to establish a unique condition at one of said logic stages and to establish a unique signal level at a corresponding one of said logic terminals, a plurality of nodes, means actuatable by an enabling signal and effective when actuated to respectively operatively connect each of said logic terminals to said nodes thereby to establish a unique logic level at one of said nodes so connected to said one of said logic terminals, and effective in the subsequent absence of said enabling signal to disconnect said logic terminals from said nodes and to operatively connect said register stages to said nodes and thereafter to sequentially transfer said unique logic level from said one of said nodes to a succeeding one of said nodes during subsequent one of said timed signals.

2. The shift register of claim 1, in which said enabling signal is present only during a predetermined number of said timed signals, said connecting means comprising first switch means operatively connected between said logic terminals and said nodes receiving and actuated by said enabling signal, and second switch means operatively connected between said register stages and said nodes receiving the complement of said enabling signal so as to be actuated thereby when said enabling signal is not present.

* * * * *

UNITED STATES PATENT OFFICE
CERTIFICATE OF CORRECTION

Patent No. 3,857,046 Dated December 24, 1974

Inventor(s) Varadi, Andrew G., Rubinstein, Richard B., Radoff, Steve

It is certified that error appears in the above-identified patent and that said Letters Patent are hereby corrected as shown below:

In item 75 "Varadibriarwood" should read -- Varadi; Briarwood --.

Signed and sealed this 11th day of February 1975

(SEAL)
Attest:

RUTH C. MASON
Attesting Officer

C. MARSHALL DANN
Commissioner of Patents and Trademarks